United States Patent [19]

Ito et al.

[11] Patent Number: 4,953,627
[45] Date of Patent: Sep. 4, 1990

[54] CERAMIC HEAT EXCHANGERS AND PRODUCTION THEREOF

[75] Inventors: Toshikazu Ito, Komaki; Takashi Harada, Nagoya; Toshiyuki Hamanaka, Suzuka, all of Japan

[73] Assignee: NGK Insulators, Ltd., Japan

[21] Appl. No.: 409,947

[22] Filed: Sep. 20, 1989

[30] Foreign Application Priority Data

Sep. 29, 1988 [JP] Japan .................. 63-242543

[51] Int. Cl.$^5$ .............................. F28D 19/00
[52] U.S. Cl. .......................... 165/8; 165/10; 156/304.1; 428/116
[58] Field of Search ............ 165/8, 10; 156/304.1; 428/116

[56] References Cited

U.S. PATENT DOCUMENTS 4,381,815  5/1983  Frost et al. ............................ 165/10
4,856,577  8/1989  Katsu et al. ............................ 165/8

*Primary Examiner*—Albert W. Davis, Jr.
*Attorney, Agent, or Firm*—Arnold, White & Durkee

[57] ABSTRACT

A ceramic heat transmission type or regenerative heat exchanger, including a plurality of matrix segments bonded together with a bonding material. A difference in coefficient of thermal expansion between the matrix segments and the bonding material is not more than 0.02% at 800° C., and a Young's modulus of the bonding material is not less than 0.4 times to not more than 1.8 times that of the matrix segment. A process for producing the ceramic heat exchangers includes the steps of extruding and firing honeycomb structural segments in which a crystalline phase is mainly composed of cordierite and a coefficient of thermal expansion in an extending direction of flow channels is not more than 0.06% at 800° C., machining an outer periphery of each of the segments, coating a bonding material around the outer periphery of each of the segments, bonding the segments together, and drying and firing the bonded segments. The bonding material has a coefficient of thermal expansion different from that of the matrix segments after the firing by not more than 0.02% at 800° C., and a Young's modulus of the bonding material being not less than 0.4 times to not more than 1.8 times that of the matrix.

2 Claims, 1 Drawing Sheet

FIG._1
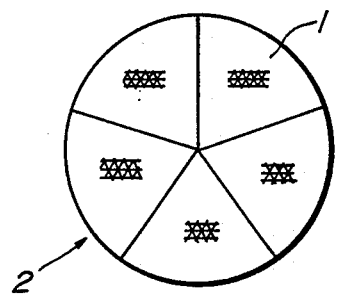
FIG._2
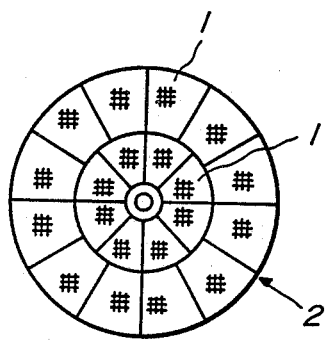
FIG._3
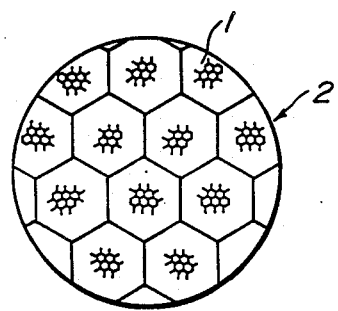

CERAMIC HEAT EXCHANGERS AND PRODUCTION THEREOF

BACKGROUND OF THE INVENTION

1. Field of the Invention

The present invention relates to ceramic heat exchangers having excellent heat exchange efficiency, small pressure loss and excellent thermal shock resistance, and the invention also relates to a production process thereof.

2. Related Art Statement

As rotary regenerative ceramic heat exchangers having excellent thermal shock resistance, NGK Insulators, Ltd. formerly disclosed a process capable of producing heat exchangers in Japanese patent publication No. 61-51,240 (U.S. Pat. No. 4,304,585 and U.S. Pat. No. 4,357,987), wherein matrix segments are bonded together with a ceramic-bonding material having almost the same composition as that of the matrix segments, and a difference in coefficient of thermal expansion between the bonding material and the segments is not more than 0.1% at 800° C.

Further, Japanese patent publication No. 47-14,838 (U.S. Pat. No. 3,634,111) discloses a foamable cement consisting mainly of $Li_2O$, $Al_2O_3$, $SiO_2$, and $TiO_2$ as an example of the ceramic-bonding material.

In addition, U.S. Pat. No. 4,335,783 discloses a process for producing heat exchangers in which bonded portions are discontinuous.

On the other hand, in the case of Japanese patent publication No. 61-51,240 (U.S. Pat. No. 4,304,585 and U.S. Pat. No. 4,357,987), heat exchanger having considerably improved thermal shock resistance can be obtained. However, since the rotary regenerative heat exchanger requires high thermal shock resistance, the matrix segments themselves must exhibit low thermal expansion, and it is also necessary to employ the bonding material exhibiting low thermal expansion. Consequently such heat exchangers possess problems in that the bonding material exhibiting low thermal expansion is greatly shrunk during firing, that variations in bonding strength are great, and reliability of the bonded portion is deteriorated.

In the case of the foamable cement disclosed in Japanese Patent publication No. 47-14,838 (U.S. Pat. No. 3,634,111), bonding materials exhibiting low heat expansion and small shrinkage can be obtained However, when cordierite matrixes are bonded by using this foamable cement, the foamable cement is insufficiently crystallized during firing for the bonding. That is, the cement reacts with cordierite, so that the coefficient of thermal expansion of the bonded portions increases, and a dimensional change and a change in heat expansion during isothermic aging at high temperatures are great. Consequently, the ceramic matrix product will unfavorably be broken at the joined portions during practical use.

In the case of the discontinuous bonding process described in U.S. Pat. No. 4,335,783, the entire heat exchanger is designed to have a flexible structure and to lessen a difference in temperature between the bending material and the segments by discontinuous bonding so that propagation of cracks is prevented to improve thermal shock resistance. However, strength of the partially bonded portions is unfavorably lower than that of the entire bonded product in the case of large size bonded product.

SUMMARY OF THE INVENTION

It is an object of the present invention to solve the above-mentioned problems, and to provide ceramic heat exchangers having excellent heat exchange efficiency, small pressure loss, and excellent thermal shock resistance. The invention is also to provide a process for producing such ceramic heat exchangers.

The ceramic heat exchangers according to the present invention are ceramic heat transmission type heat exchangers or regenerative heat exchangers, characterized in that a difference in coefficient of thermal expansion between matrix segments and a bonding material is not more than 0.02% at 800° C., and a Young's modulus of the bonding material is not less than 0.4 times to not more than 1.8 times that of the matrix segments.

The process for producing ceramic heat exchangers according to the present invention is characterized by comprising the steps of extruding and firing honeycomb structural matrix segments in which a main component of a crystalline phase is cordierite and which have a coefficient of thermal expansion in a direction of flowing channels of not more than 0.06% at 800° C.; machining the outer peripheries thereof; coating a bonding material on the outer peripheries; and bonding the matrix segments, which are dried and fired. The bonding material has a thermal expansion different from that of the matrix segments by not more than 0.02% at 800° C. after the firing, and a Young's modulus of not less than 0.4 times to not more than 1.8 times that of the matrix.

In the above construction, the matrix segments which have a coefficient of thermal expansion of not more than 0.06% at 800° C. in a flowing direction and the bonding material which has the specified difference in coefficient of thermal expansion between the matrix segments and the bonding material, and which has the specified Young's modulus are used. Thereby, stress concentration upon the bonded portions is prevented so that the ceramic heat exchanger having excellent thermal shock resistance can be obtained. The present invention is based on the above-mentioned novel discovery.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains, without departing from the spirit of the invention or the scope of claims appended hereto.

BRIEF DESCRIPTION OF THE ATTACHED DRAWINGS

For a better understanding of the invention, reference is made to the attached drawings, wherein:

FIGS. 1 through 3 are views of embodiments of the ceramic heat exchangers according to the present invention.

DETAILED DESCRIPTION OF THE INVENTION

First, the limitations made in the present invention will be explained below.

The reason why the difference in coefficient of thermal expansion between the matrix segment and the bonding material is set at not more than 0.02% at 800° C. is that if it exceeds 0.02%, thermal shock resistance of the bonded portions will not meet the range aimed at in the invention. On the other hand, the reason why the Young's modulus of the joined portions is limited to not less than 0.4 times to not more than 1.8 times that of the matrix segment is that if it is less than 0.4 times the strength of the bonded body itself is far weaker than that of the matrix, while if it exceeds 1.8 times, the thermal shock resistance of the bonded portions does not meet the intended range in the present invention.

In the case of LAS glass, the intended coefficient of thermal expansion of the bonding material can be attained by adjusting the composition to 55.0 to 78.0% by weight of $SiO_2$, 12.0 to 25.0% by weight of $Al_2O_3$, not more than 0.2% by weight of each of $Na_2O$ and $K_2O$, 1.0 to 3.0% by weight of CaO, and 3.0 to 6.0% by weight of $Li_2O$. The Young's modulus of the bonding material can appropriately be adjusted by adding into the bonding material a given amount of a foaming agent which forms pores after firing, such as graphite, carbon powder or resin beads. Any one of the above-mentioned processes is a favorable process for attaining the coefficient of thermal expansion and the Young's modulus as desired. It goes without saying that so long as the coefficient of thermal expansion and the Young's modulus of the bonding material can be obtained as desired, any process may be employed.

In order to obtain rotary regenerative ceramic heat exchangers by the producing process according to the present invention, a green body is extruded in the form of a honeycomb structural matrix segment having a triangular, rectangular, or hexagonal cell shape or the like, which is then fired. Thereafter, as shown in FIGS. 1 through 3 by way of example, a plurality of such segments 1 in which as a main component of cordierite has a coefficient of thermal expansion of not more than 0.06% at 800° C., are machined to produce an integrated rotary regenerative ceramic heat exchanger 2 therefrom. Specifically, a ceramic bonding material such as an LAS based amorphous glass powder having a chemical composition consisting mainly of $Li_2O$, $Al_2O_3$, and $SiO_2$ is then coated upon the segments in such a thickness to be 0.1 to 6 mm after firing, the segments are joined together fully dried, and then fired at 1,100 to 1,200° C. for 1 to 4 hours. Thereby, the rotary regenerative ceramic heat exchanger can be obtained.

It is possible that the difference in coefficient of thermal expansion between the matrix segments and the bonding material and the Young's modulus of the bonding material are adjusted to not more than 0.02% at 800° C. and 0.4 times to 1.8 times that of the matrix, respectively, by adjusting the composition of the bonding material, such as $Li_2O$, $Al_2O_3$, and $SiO_2$ and adding the foaming agent thereto.

Now, actual examples of the present invention will be explained.

EXAMPLES

By extruding a green body, segments A with cells each having a long side of 1.2 mm and a short side of 0.8 mm and segments B with cells having a long side of 1.0 mm and a short side of 0.5 mm were shaped. The wall thickness of the segments was 0.1 mm. Then, two kinds of matrix segments of 130×180×170 mm were prepared by firing the above segments at 1,400° C. for 6 hours. At that time, 35×6 of the matrix segments were obtained for each kind. The outer periphery of each of these two kinds of the segments was machined to give an integral rotary regenerative heat exchanger after bonding. Next, a pasty bonding material was applied to portions of the segments to be bonded in such a thickness that the thickness of the bonding material after the firing might be 1.5 mm. Then, the segments were bonded, fully dried, and fired at 1,150° C. for 2 hours. The above pasty bonding material was obtained by adding 2.0, 5.0, 10.0, 20.0 or 30.0% by weight of graphite as a foaming agent to an LAS based amorphous glass powder having a chemical composition of 70.0% by weight of $SiO_2$, 24.0% by weight of $Al_2O_3$, 4.3% by weight of $Li_2O$, and 1.5% by weight of CaO, and further adding an organic binder and water thereto. Thereby, an integrated rotary regenerative heat exchanger having a diameter of 700 mm and a thickness of 70 mm was obtained. Furthermore, for the comparison purpose, a conventional rotary regenerative heat exchanger was prepared in the same manner as mentioned above by using a bonding material to which no foaming agent was added.

A fired sample of the bonding material was obtained by drying the above bonding material and firing it under the same conditions mentioned above, and used for measuring the Young's modulus. A thermal shock resistance-evaluating test and a fracture-evaluating test were carried out for an integral structure and at a bonded portion, respectively. Results are shown in Table 1. The thermal shock resistance was evaluated based on the maximum temperature at which the sample was not cracked even when extracted from an electric furnace after having been held in a specific location of the furnace. A fracture test was determined by preparing a sample having 4×3×40 mm in which a bonded portion was located at the center, and effecting a four point bending test. Further, the Young's modulus of the matrix was measured in such a direction that long sides of the cells were arranged parallel with the longitudinal direction of the sample. A loading direction was parallel with the cell channels.

TABLE 1

| | Bonding material | | | Matrix | | | Difference coefficient of thermal expansion | Ratio in Young's modulus | Broken position | Thermal shock-resisting temperature (°C.) | Remarks |
|---|---|---|---|---|---|---|---|---|---|---|---|
| Run No. | Added amount of graphite (wt %) | Coefficient of thermal expansion*2 (%) | Young's modulus*2 ($\times 10^2$ kgf/mm$^2$) | Cell structure*3 | Coefficient of thermal expansion*2 (%) | Young's modulus*1 ($\times 10^2$ kgf/mm$^2$) | | | | | |
| 1 | 0 | 0.034 | 12.5 | A | 0.060 | 3.5 | 0.026 | 3.6 | segment | 600 | Reference Example |
| 2 | | | | B | 0.050 | 5.0 | 0.016 | 2.5 | " | 650 | Reference Example |
| 3 | 2.0 | 0.036 | 9.0 | A | 0.060 | 3.5 | 0.024 | 2.6 | " | 700 | Reference |

TABLE 1-continued

| | Bonding material | | | Matrix | | | Difference coefficient of thermal expansion | Ratio in Young's modulus | Broken position | Thermal shock-resisting temperature (°C.) | Remarks |
|---|---|---|---|---|---|---|---|---|---|---|---|
| Run No. | Added amount of graphite (wt %) | Coefficient of thermal expansion*2 (%) | Young's modulus*2 ($\times 10^2$ kgf/mm$^2$) | Cell structure*3 | Coefficient of thermal expansion*2 (%) | Young's modulus*1 ($\times 10^2$ kgf/mm$^2$) | | | | | |
| 4 | | | | B | 0.050 | 5.0 | 0.014 | 1.8 | " | 750 | Example Present invention |
| 5 | 5.0 | 0.038 | 6.3 | A | 0.060 | 3.5 | 0.022 | 1.8 | " | 700 | Reference Example |
| 6 | | | | B | 0.050 | 5.0 | 0.012 | 1.3 | " | 800 | Present invention |
| 7 | 10.0 | 0.040 | 3.6 | A | 0.060 | 3.5 | 0.020 | 1.0 | " | 800 | Present invention |
| 8 | | | | B | 0.050 | 5.0 | 0.010 | 0.7 | " | 850 | Present invention |
| 9 | 20.0 | 0.042 | 2.0 | A | 0.060 | 3.5 | 0.018 | 0.6 | " | 750 | Present invention |
| 10 | | | | B | 0.050 | 5.0 | 0.008 | 0.4 | " | 800 | Present invention |
| 11 | 30.0 | 0.045 | 1.4 | A | 0.060 | 3.5 | 0.015 | 0.4 | " | 750 | Present invention |
| 12 | | | | B | 0.050 | 5.0 | 0.005 | 0.3 | bonded portion broken | 700 | Reference Example |

*1 measured by Miller process
*2 40~800° C.
*3 A : 1.2 mm × 0.8 mm, B : 1.0 mm × 0.5 mm From the above results, it is seen that as compared with Reference Example Nos. 1 through 3, 5 and 12, Examples 4 and 6 through 11 according to the present invention using the bonding material with the difference in coefficient of thermal expansion and the ratio in Young's modulus as specified have higher thermal shock-resisting temperatures and are free from fracture from the bonded portions.

As is clear from the above-mentioned explanation, according to the ceramic heat exchanger and the production process thereof in the present invention, the ceramic heat exchangers having excellent thermal shock resistance can be obtained by using the bonding material suited for the properties of the matrix segments.

What is claimed is:

1. A ceramic heat transmission type or regenerative heat exchanger comprising a plurality of matrix segments, said matrix segments being bonded together with a bonding material, wherein a difference in coefficient of thermal expansion between the matrix segments and the bonding material is not more than 0.02% at 800° C. and a Young's modulus of the bonding material is not less than 0.4 times to not more than 1.8 times that of the matrix segments.

2. A process for producing ceramic heat exchangers, said process comprising the steps of extruding and firing honeycomb structural matrix segments in which a crystalline phase is mainly composed of cordierite and a coefficient of thermal expansion in an extending direction of flow channels is not more than 0.06% at 800° C.; machining an outer periphery of each of the segments; coating a bonding material around the outer periphery of each of the segments; bonding the segments together; and drying and firing the bonded segments;

wherein the bonding material has a coefficient of thermal expansion different from that of the matrix segments after the firing by not more than 0.02% at 800° C., and a Young's modulus of the bonding material is not less than 0.4 times to not more than 1.8 times that of the matrix.

* * * * *